United States Patent [19]
Turina

[11] Patent Number: 6,031,832
[45] Date of Patent: Feb. 29, 2000

[54] METHOD AND APPARATUS FOR IMPROVING PERFORMANCE OF A PACKET COMMUNICATIONS SYSTEM

[75] Inventor: Dalibor Turina, Täby, Sweden

[73] Assignee: Telefonaktiebolaget L M Ericsson (publ), Stockholm, Sweden

[21] Appl. No.: 08/755,572

[22] Filed: Nov. 27, 1996

[51] Int. Cl.[7] .................................................. H04B 7/212
[52] U.S. Cl. .......................................... 370/348; 370/349
[58] Field of Search .................................... 370/322, 329, 370/331, 336, 337, 443, 348, 314, 321, 326, 328, 330

[56] References Cited

U.S. PATENT DOCUMENTS

| | | | |
|---|---|---|---|
| 5,420,864 | 5/1995 | Dahlin et al. | 370/347 |
| 5,590,133 | 12/1996 | Billstrom et al. | 370/349 |
| 5,640,679 | 6/1997 | Lundqvist et al. | 445/525 |
| 5,729,541 | 3/1998 | Hamalainen et al. | 370/337 |
| 5,734,645 | 3/1998 | Raith et al. | 370/329 |
| 5,784,362 | 7/1998 | Turina | 370/321 |
| 5,790,551 | 8/1998 | Chan | 370/458 |

FOREIGN PATENT DOCUMENTS

| | | |
|---|---|---|
| 0 681 406 A1 | 5/1995 | European Pat. Off. . |
| 0 687 078 A2 | 6/1995 | European Pat. Off. . |
| 08154097 | 6/1996 | Japan . |
| WO 96/37079 | 11/1996 | WIPO . |

OTHER PUBLICATIONS

*Dynamic Channel Allocation Procedures for Packet Data Services over GSM Networks* by Giuseppe Bianchi, Flaminio Borgonovo, Luigi Musumeci and Massimo Perino Departimento di Elettronica e Informazione, Via G. Reiss Romoli 274, 10148, Torino, Italy ISS Symposium, ISS '95, Apr. 1995, vol. 1—Published Apr. 23, 1995.

Packet Reservation Multiple Access for Local Wireless Communications, D.J. Goodman, R.A. Valenzuela, K.T. Gayliard and B. Ramamurthi AT&T Bell Laboratories, Holmdel, New Jersey 07733.

*Primary Examiner*—Hassan Kizou
*Assistant Examiner*—Mitchell Slavitt
*Attorney, Agent, or Firm*—Jenkens & Gilchrist, P.C.

[57] ABSTRACT

A communications system is provided that uses a multiple access packet reservation type of protocol. The physical channels required for the packet transfers are specially allocated to one mobile station (referred to as a "VIP MS"). The VIP MS has the exclusive priority to use these allocated physical channels for packet data as needed. Consequently, the VIP MS always has the negotiated bandwidth available for the packet transfers. Furthermore, since the VIP MS is given the highest exclusive priority to access these physical channels ("VIP priority"), by allocating a reserved random access channel dedicated to the VIP MS (e.g., on one allocated uplink channel), the variable random access delays experienced by prior systems no longer exist Since the VIP MS is always scheduled first for transmissions on the downlink, and reserved access is provided for the VIP MS on the uplink, only a constant delay period for the uplink and downlink is involved. In other words, the VIP MS is guaranteed both a bandwidth for the packet transfers and a constant uplink and downlink delay.

35 Claims, 4 Drawing Sheets

METHOD AND APPARATUS FOR IMPROVING PERFORMANCE OF A PACKET COMMUNICATIONS SYSTEM

BACKGROUND OF THE INVENTION

1. Technical Field of the Invention

The present invention relates in general to the telecommunications field and, in particular, to a method and apparatus for improving the performance of a packet communications system that uses a multiple access reservation type of protocol.

2. Description of Related Art

Generally, in a conventional mobile packet radio communications system, a base station (BS) communicates with a plurality of mobile stations (MSs) over one or more shared packet radio channels. Downlink packet traffic is scheduled by the BS, whereby downlink contention between MSs is avoided. However, in order for the MSs to gain access to the BS on the uplink, the MSs compete using a random multiple access protocol, which inevitably leads to contention and collisions on the uplink.

One multiple access type of protocol, which is suitable for use with a time division multiple access (TDMA) communications system (e.g., a TDMA cellular radio system), is a reservation slotted-ALOHA multiple access protocol. For example, on the uplink, a MS can transmit a random access request message over the air interface to the BS, in accordance with a conventional slotted-ALOHA multiple access protocol. If the BS successfully receives that random access request message, it allocates or reserves a traffic channel for that MS, and thereafter contention-free (e.g., uncontended) packet transfers can be made between that MS and the BS.

Typically, if a MS does not receive a traffic channel reservation from a BS within a predetermined period of time, that MS will re-transmit the random access request message. A channel reservation may not be made by the BS for a number of reasons, such as, for example, if the random access request message has collided with another message on the uplink, or the request message has experienced an error during transmission. Moreover, the BS may have experienced a momentary capacity overload, so that any random access request correctly received during the overload period could not be processed.

As mentioned earlier, on the downlink, the BS (or some other node on the network side of the system) schedules the transmissions to different MSs. However, if the MSs being scheduled for downlink transmission have different levels of priority, the BS (or scheduling network node) must schedule those transmissions while taking the different MSs' priorities into account. Consequently, the need to prioritize the scheduling of different downlink transmissions leads to variable delays in scheduling transmissions for individual MSs, especially during periods of traffic congestion. These delays can vary depending upon how much of the competing traffic has the same or a higher priority. Typically, the lower priority MSs will experience the longer scheduling delays.

The General Packet Radio Service (GPRS) is a new packet data service that is being specified for use in the digital Global System for Mobile Communications (GSM). The GPRS standard requires the use of a set of communications channels optimized for packet data. The bandwidth required for individual users (i.e., MSs) can be provided by a trunked multi-channel operation. In other words, packets can be sent to or from a MS over a plurality of parallel channels. Two or more priority levels are used when scheduling packet transfers (for both the uplink and downlink). Although the GPRS is a new service, the performance optimization problems that are associated with the GPRS (e.g., in the GSM) are applicable to other packet data services and multiple access reservation systems as well. For a comprehensive overview of the GSM and, in particular, GSM channel resource management and allocation, refer to "The GSM System for Mobile Communications" by M. Mouly and M. B. Pautet, Cell & Sys., Copyright 1992 (ISBN: 2-9507190-0-7).

For example, referring to the current GPRS standard (GSM Technical Specification GSM 04.60, Version 0.9.1, Sep., 26, 1996)©, the physical channel dedicated to packet data traffic in the GPRS is called a Packet Data Channel (PDCH). For a GPRS mobile-originated packet transfer, a MS initiates the packet transfer by making a random access request on the PDCH uplink over the Packet Random Access Channel (PRACH). The PRACH can be referred to as a "random access sub-channel". The MS is allowed to select the random access sub-channel to make an access request, when the uplink state flag (USF) associated with the random access sub-channel is set to "free". The USF, which comprises certain bits at the beginning of each Radio Link Control (RLC) block sent on the downlink, is used on the PDCH to enable multiplexing of the uplink traffic. Currently, for the GPRS, one USF value can be used to denote that the random access sub-channel is "free", and three other USF values used to reserve the uplink for three different MSs. As an alternative to using the USF to determine the availability of a random access sub-channel, the MS can select a random access sub-channel according to a pre-defined rule. The GPRS access request includes information that identifies the MS, and can also include priority level information for that MS.

The network responds to a random access request by transmitting a channel reservation command on the PDCH downlink over the Packet Access Grant Channel (PAGCH). The channel reservation command assigns (reserves) future time slots to that MS for uplink transfers of a variable length packet. If the network does not respond to the MS's random access request, the MS will make the request again, but only after a predetermined (or random) period of time. The MS transmits the variable length packet in the reserved time slots. In the GPRS, the packet is transmitted on the PDCH over the Packet Data Traffic Channel (PDTCH). The network sends an acknowledgment message to the MS if the complete packet has been correctly received. Otherwise, the MS re-transmits either the complete packet or any portions of the packet where transmission errors have occurred.

For a GPRS mobile-terminated packet transfer, th network initiates a transfer to a MS by (optionally paging the MS to which the packet is addressed. In the GPRS, the page is transmitted on the PDCH over the Packet Paging Channel (PPCH), or on the conventional GSM Paging Channel (PCH). However, the addressed MS does not have to be paged if the network knows the MS's current cell location. If paged successfully, the MS initiates a paging response by transmitting a packet channel request on the PRACH or RACH. The network responds with a packet resource assignment message on the Packet Associated Control Channel (PACCH) The packet is then transmitted to the MS over the PDTCH. The network's scheduling of the packet transmission is based on the current traffic load and the priority that was given to the packet. The MS sends an acknowledgment message to the network if the complete packet has been correctly received. Otherwise, the network re-transmits either the complete packet or any portions of the packet where transmission errors have occurred.

A problem experienced with such random access reservation type protocols is that the MSs experience various packet transfer delays. For example, every uplink packet transfer is preceded by the channel reservation process (unless the packets being transferred are concatenated). A MS sends a random access request message to the network, which the network must successfully receive. Consequently, there is a delay until the access can be obtained. If a channel reservation message is not received by the MS, the timing associated with re-transmitting the access request message is controlled by an independent timer, which adds yet another delay. Additionally, if the network's access capacity is momentarily overloaded, more random access requests may be received than can be processed during that time, which triggers respective countdowns until the next access attempts can be made. Those delays are compounded and in addition to the delays associated with prioritizing the uplink packet transfers, which results in numerous variable delays encountered in accessing the uplink channel.

On the downlink, the size of the current traffic load, and the process of prioritizing the downlink packet transfers, are considerations that also result in variable delays when the channel resources allocated for the packet data service transmissions are insufficient. As such, both the uplink and downlink packet traffic are thus subject to a variable quality of service (QoS), which can be expressed in terms of both variable time delays and decreased throughput.

The GPRS standard specifies four different QoS levels, which are consequently mapped across the different communication layers of the air interface. On the lower two layers (medium access control layer and physical layer), these four QoS levels are mapped onto four priority levels. These four priority levels are used to prioritize access to the system. All of the GPRS dedicated PDCHs are shared resources, for which packets departing for, and emanating from, different MSs compete with each other for access. The system's resource manager is tasked to allocate a sufficient number of dedicated PDCHs, which can both handle the allocated load and meet the QoS requirements for all four priority levels. However, a significant problem arises when the lower priority levels are suppressed, because the load required by the higher priority levels can exceed the channel resources provided. Currently, the resource manager would have to either allocate more resources (at the expense of other services), or operate with a degraded QoS.

SUMMARY OF THE INVENTION

It is an object of the present invention to provide a packet data service QoS level that is similar to the QoS level of a circuit-switched service.

It is also an object of the present invention to guarantee a negotiated amount of bandwidth to a mobile station for packet data services.

It is also an object of the present invention to guarantee a constant delay to a mobile station for packet data services.

It is yet another object of the present invention to increase system throughput and also lower the costs for radio end users of packet data services of the wire-bound network.

In accordance with the present invention, the foregoing and other objects are achieved in a communications system that uses a multiple access packet reservation type of protocol, by specially allocating the physical channels required for the packet transfers to one mobile station (referred to as a "VIP MS"). For example, these specially allocated physical channels can comprise a plurality of uplink and downlink packet data channels. The VIP MS, which has been allocated these dedicated channels, has the exclusive priority to use them as needed. Consequently, the VIP MS always has this negotiated bandwidth available for the packet transfers.

Furthermore, since the VIP MS is given the highest exclusive priority to access these physical channels ("VIP priority"), by allocating a reserved random access channel dedicated to the VIP MS (e.g., on one allocated uplink channel), the numerous and variable random access delays experienced by prior mobile stations no longer exist. Since the VIP MS is always scheduled first for transmissions on the downlink, and reserved access is provided for the VIP MS on the uplink, only a constant delay period for the uplink and downlink transmissions is involved. In other words, the VIP MS is guaranteed both a bandwidth for the packet transfers and a constant uplink and downlink delay.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–7 of the drawings, like numerals being used for like and corresponding parts of the various drawings.

Essentially, for a communications system according to the present invention, using a multiple access packet reservation type of protocol, the physical channels required for the packet transfers are specially allocated for one MS. This MS can be referred to as a "VIP MS". For the GPRS, for example, these specially allocated physical channels can comprise a plurality of uplink and downlink channels. Specifically, one PDCH in the GPRS comprises one uplink and one downlink channel, and is defined as one physical channel dedicated for packet data. The number of allocated uplink channels can be the same as, or different than, the number of allocated downlink channels. The VIP MS, which has been allocated these dedicated channels, has the right to use them as needed. Consequently, the VIP MS always has the required bandwidth available for the packet transfers. However, the unused capacity of these dedicated channels may be used by other MSs.

In other words, the VIP MS is given the highest exclusive priority to access these physical channels (referred to hereinafter as the "VIP priority"). Consequently, by allocating a reserved random access sub-channel dedicated to that VIP MS (e.g., on one allocated uplink channel), the existing problem of variable delays experienced by prior systems during random access is solved. Since the VIP MS is always scheduled first for transmissions on the downlink, and reserved access is provided for the VIP MS on the uplink, only a constant delay period for the uplink and downlink is involved. In other words, the VIP MS is guaranteed both a bandwidth for the packet transfers and a constant uplink and downlink packet transfer delay.

Figure 1:
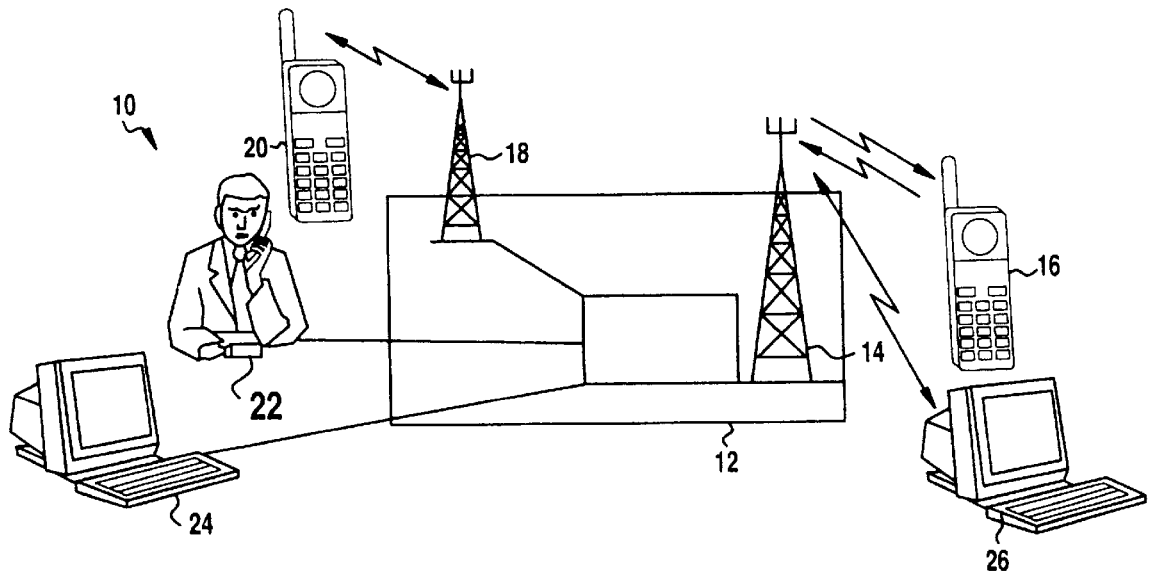
FIG. 1 is a simplified schematic block diagram of a telecommunications system that can be used to implement a method of transferring packet data with a VIP Mobile Station, in accordance with the preferred embodiment of the present invention.

FIG. 1 is a simplified schematic block diagram of a telecommunications system that can be used to implement a method of transferring packet data with a VIP Mobile Station, in accordance with the preferred embodiment of the present invention. System 10 includes a communications network 12. Network 12 includes a base station/transceiver section 14. Network 12 can be a local or wide area network (LAN or WAN), or a Public Land Mobile Network (PLMN) such as the cellular network in the GSM. Generally, network 12 can be any type of communications network that provides packet data services using shared packet data channels. In the preferred embodiment shown (for illustrative purposes only), network 12 is a digital TDMA cellular mobile radio network.

Network 12 communicates with a VIP MS 16 via the network's base station/transceiver section 14 and the air interface, essentially using existing air interface and switching communications protocols. VIP MS 16 is given the VIP priority for resource scheduling and uplink random access priority purposes. The VIP priority can be a "0" or highest exclusive level of priority in a typical scheduling priority hierarchy. Alternatively, the VIP priority can be a special priority level that must be considered by the system resource manager to be higher than any other conventional level of scheduling priority.

Network 12 also communicates with other, non-VIP mobile stations (represented by a mobile phone 20) via a second base station and/or transceiver section 18 in the network, fixed telephones (e.g., phone 22) in a Public Switched Telephone Network (PSTN), and terminal work stations (e.g., computer terminals 24 and 26). As shown, the communications between terminal 24 and network 12 are via a wired line connection. The communications between terminal 26 and the network are via a wireless radio connection through base station and/or transceiver section 14. Consequently, communications to/from phones 22 and terminals 24 and 26 can be routed to/from mobile station(s) 20 or VIP MS 16 by network 12.

Figure 2:
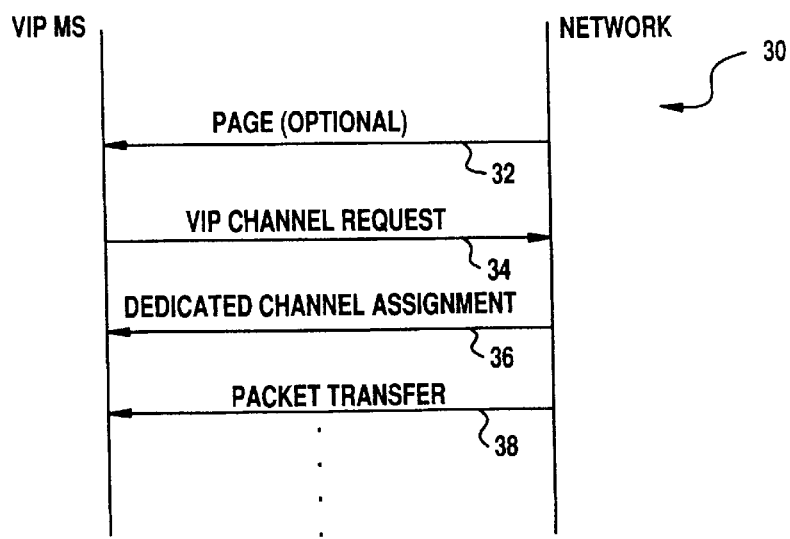
FIG. 2 is a sequence diagram that illustrates how a mobile-terminated packet data transfer can occur, in accordance with the preferred embodiment of the present invention.

FIG. 2 is a sequence diagram that illustrates how a mobile-terminated packet data transfer can occur, in accordance with the preferred embodiment of the present invention. Referring to FIG. 2, according to step 32 in sequence 30, network 12 initiates the transfer of a data packet to VIP MS 16, by sending a packet paging message over a packet paging physical channel on the downlink. For the GPRS, a Packet Paging message can be sent over the downlink Packet Paging Channel (PPCH) or Paging Channel (PCH). If the network knows the current cell position of VIP MS 16, then the paging message need not be sent.

At step 34, VIP MS 16 sends a channel reservation request message over a random access sub-channel on the uplink. The request message may indicate that VIP MS 16 has a VIP priority. In the GPRS, a VIP channel reservation request message can be sent over the uplink PRACH or Random Access Channel (RACH). Alternatively, the VIP priority may already be known by the network, from a preceding QoS negotiation or from subscriber data. Notably, the QoS negotiation could be based on use of the resource reservation protocol ("RSVP") feature that has been specified for the "Internet Protocol". The RSVP feature is intended for reserving resources in communications across the Internet. Also, for example, a table could be provided (e.g., in a database) and used to translate requests for bandwidth and delays made over the mobile air interface, to Internet bandwidth and delays of equal or greater and equal or smaller amounts respectively.

In response, at step 36, network 12 sends a dedicated physical traffic channel assignment message over a packet access grant channel or control channel on the downlink. The assignment message contains a list of dedicated packet data traffic channels to be used for the transfer. In the GPRS, the network can send (over the downlink) a Packet Resource Assignment message for downlink Logical Link Control (LLC) frame transfers. The Packet Resource Assignment message contains the list of dedicated PDCHs to be used. At step 38, network 12 sends the packet over the downlink dedicated packet data channels (e.g., dedicated PDTCHs in the GPRS). In sum, by providing "guaranteed bandwidth" or dedicated physical channels for the downlink packet transfer, the resources allocated for the transfer should be sufficient, the VIP MS can be guaranteed a constant delay, and the downlink traffic is not subject to a variable QoS.

Figure 3:
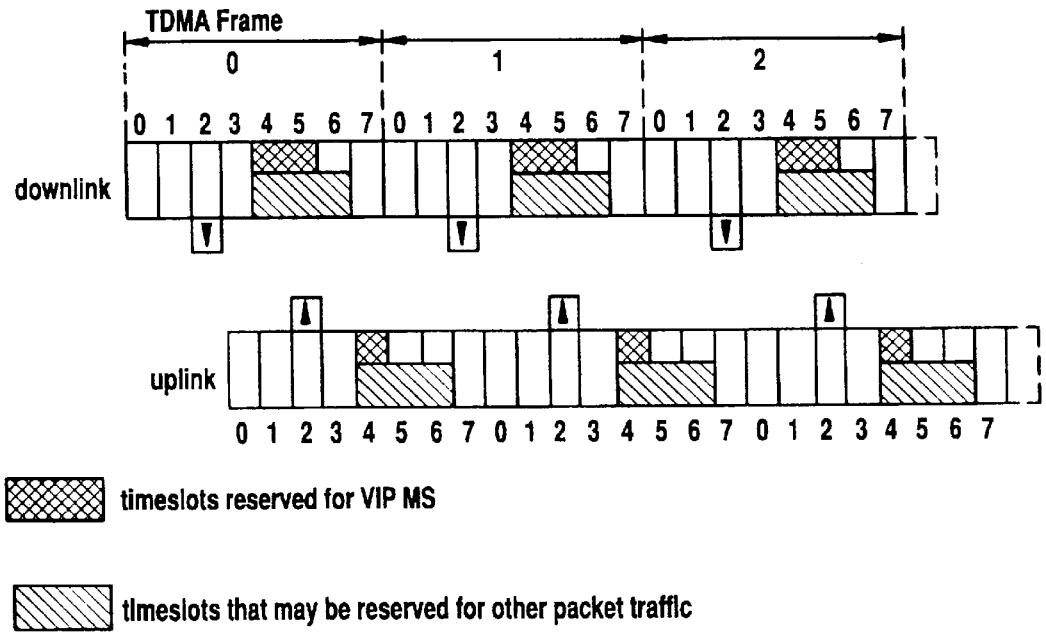
FIG. 3 is a diagram that illustrates the downlink and uplink frames for packet transfers between a network and a VIP MS, in accordance with the preferred embodiment of the present invention.

FIG. 3 is a diagram that illustrates the downlink and uplink frames for packet transfers between a network and a VIP MS, in accordance with the preferred embodiment of the present invention. For the illustrative embodiment, a series of TDMA frames is shown with eight time slots per frame. For example, the GSM employs eight time slots per TDMA frame. However, it should be understood that the invention is not intended to be limited to a certain number of time slots per frame. Any practical number of TDMA time slots per frame could be used. As shown, the downlink physical channels dedicated to the VIP MS are realized as dedicated time slots in each frame, which are reserved in the first place for the VIP MS. However, as discussed below, during idle periods between VIP packets, these reserved VIP MS time slots can be temporarily utilized for other traffic. Consequently, the network throughput is significantly improved over conventional systems, because the dedicated VIP MS physical channels can be accessed for packet data traffic to/from other mobile stations during idle periods.

Figure 4:
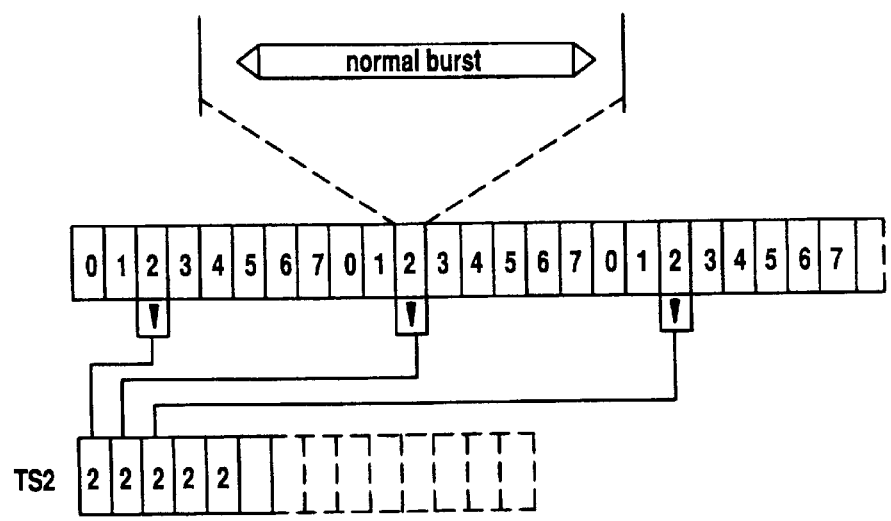
FIG. 4 is a diagram that illustrates how a normal burst can be mapped onto a single time slot in a TDMA frame.

The information format transmitted during one time slot in a TDMA frame is called a "burst". A "normal burst" is used to carry information on a traffic channel and certain control channels. FIG. 4 is a diagram that illustrates how a normal burst can be mapped onto a single time slot in a TDMA frame. One time slot in consecutive TDMA frames is defined as a physical channel. Consequently, a series of normal bursts (of information) are transmitted in time slots that make up a physical channel.

Figure 5:
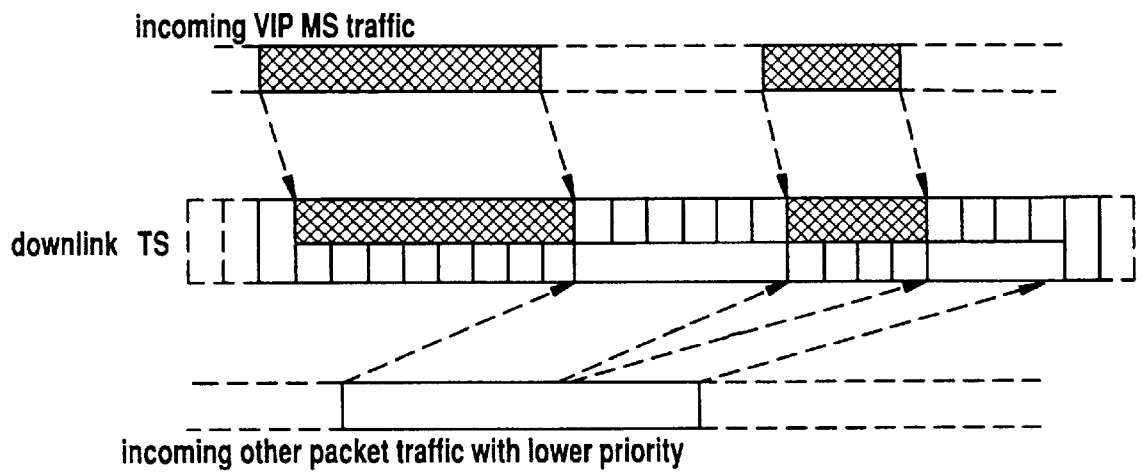
FIG. 5 is a diagram that illustrates how VIP MS and other packet traffic can be sent over the downlink physical channel, in accordance with the sequence described in FIG. 2.

FIG. 5 is a diagram that illustrates how VIP MS and other packet traffic can be sent over the downlink physical channel, in accordance with the sequence described in FIG.

2. The incoming packet traffic to be directed to the VIP MS is sent by the network (starting with the next available time slot) over the reserved downlink physical channels (one channel is shown in FIG. 5). As shown, the packet transfers are not necessarily concatenated. Consequently, during idle periods when the MS VIP packets are not being transferred, the other incoming packet traffic destined for non-VIP mobiles can be sent over the VIP MS dedicated channels.

Figure 6:
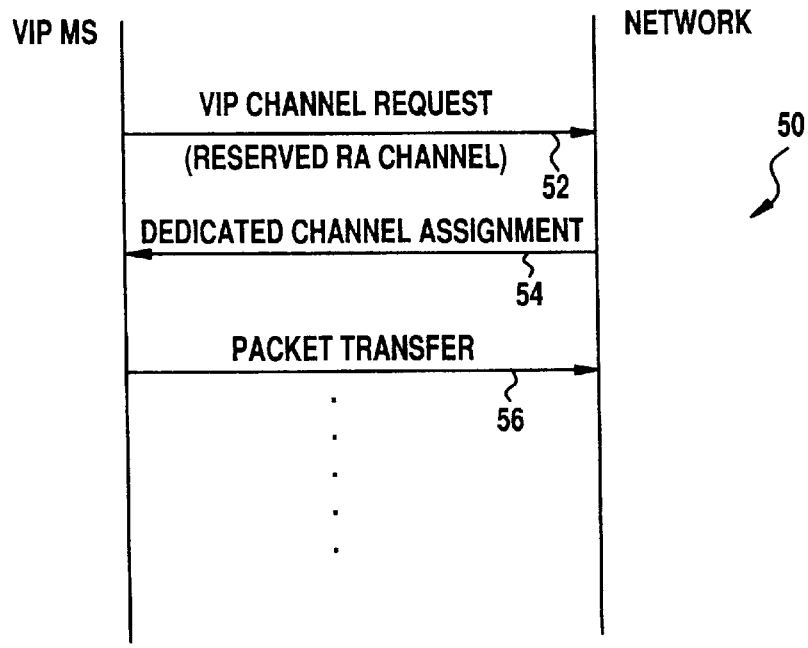
FIG. 6 is a sequence diagram that illustrates how a mobile-originated packet data transfer can occur, in accordance with the preferred embodiment of the present invention.

FIG. 6 is a sequence diagram that illustrates how a mobile-originated packet data transfer can occur, in accordance with the preferred embodiment of the present invention. According to step 52 in sequence 50, VIP MS 16 sends a VIP packet channel request message over a reserved random access sub-channel on the uplink. By allocating the reserved random access sub-channel to that VIP MS (e.g., on one allocated uplink channel), the uplink random access variable delay problem is solved. Alternatively, but a less desirable solution, is to dimension the random access sub-channel on the uplink so that channel access collisions between the VIP MS and other MSs are less likely to occur. In the GPRS, the VIP MS packet channel request can be sent over a reserved PRACH on the uplink.

At step 54, network 12 sends a dedicated traffic channel assignment message over a packet access grant channel or control channel on the downlink. The assignment message contains a list of dedicated packet data traffic channels to be used for the transfer. In the GPRS, the network can send (over the downlink) a Packet Resource Assignment message for downlink Logical Link Control (LLC) frame transfers. The Packet Resource Assignment message contains the list of dedicated PDCHs to be used. At step 56, VIP MS 16 sends the packet over the uplink dedicated packet data channels (e.g., dedicated PDTCHs in the GPRS).

Figure 7:
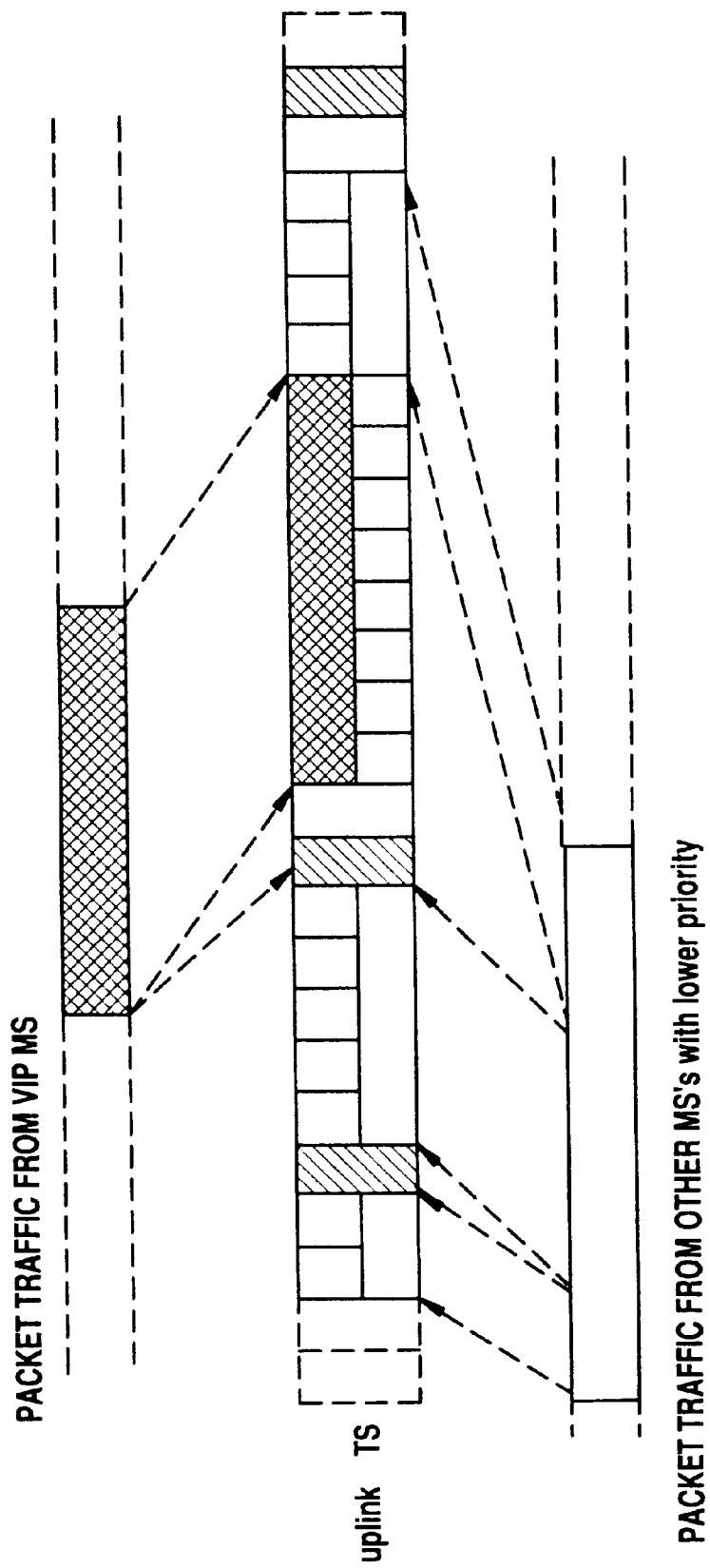
FIG. 7 is a diagram that illustrates how VIP MS and other packet traffic can be sent over the uplink physical channel, in accordance with the sequence described in FIG. 6.

FIG. 7 is a diagram that illustrates how VIP MS and other packet traffic can be sent over the uplink physical channel, in accordance with the sequence described in FIG. 6. The packet traffic to be directed to the network is sent by the VIP MS (starting with the second available time slot after the next reserved access time slot) over the reserved uplink physical channels (one channel is shown in FIG. 7). The packet transfers can be concatenated or un-concatenated. Consequently, during idle periods when the MS VIP packets are not being transferred, the other packet traffic destined for the network can be sent over the VIP MS dedicated channels. FIG. 7 also illustrates the use of certain random access channels (striped time slots) reserved exclusively for the VIP MS, in order to avoid uplink access collisions.

Notably, in addition to the advantages that can be ascribed to the above-described embodiment, prioritizing the downlink transfers in the GPRS can be fine-tuned by scheduling the downlink transmissions using a short identifier called the "Temporary Frame Identity" (TFI) which is part of every 20 ms Radio Link Control (RLC) block. Consequently, all such blocks can be associated with a specific Logical Link Control (LLC) frame and specific mobile station. Also, a similar level of prioritization can be achieved on the uplink, by using the Uplink State Flag (USF) to control the uplink transmission scheduling (also on the 20 ms basis). Consequently, different Packet Data Channels (PDCHs) can be opened and closed for certain mobile stations. Assigned uplink and downlink packet data channels are also released for other traffic in response to a signal from either the VIP MS 16 or the network. This signal notifies the network or other mobile stations that the released channel may be used during, for example, an idle traffic period of the VIP MS 16. Other traffic on the packet data channel is interrupted, however, when the VIP MS 16 uses the previously released packet data channel. In this way, channel utilization can be maximized, and the QoS obtained therefrom is comparable to the QoS that can be obtained with a conventional circuit-switched connection.

Notably, when a VIP MS (e.g., located in one cell) moves into a different cell, the MS can be granted the same exclusive resources. This grant can be made either in response to the MS renegotiating those resources in the new cell, or the same effect can be obtained from signalling within the network. For the latter case, during the handover from the one cell to the other (e.g., when the MS "presents" itself to the new cell), the cell update process can be performed by the MS, and if enough resources are available in the new cell, the network can automatically "transfer" or reallocate the VIP resources from the old cell. This automatic reallocation of resources can be accomplished, for example, using a special signalling procedure, such as the type used for a conventional handover.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving performance of a mobile communications system that uses at least a multiple access packet reservation protocol, comprising the steps of:

allocating to a first mobile station an exclusive use of at least a first channel in said mobile communications system, for carrying downlink packet traffic;

reserving for said first mobile station a second channel in said mobile communications system, for enabling uncontended access by uplink packet traffic;

allocating to said first mobile station an exclusive use of at least a third channel in said mobile communications system, for carrying said uplink packet traffic; and wherein said first mobile station has exclusive use of said first and third channels and reserved access to said second channel during a same service interval.

2. A method for improving performance of a mobile communications system that uses at least a multiple access packet reservation protocol, comprising the steps of:

allocating to a first mobile station an exclusive priority for use of at least a first channel in said mobile communications system, for carrying downlink packet traffic;

reserving for said first mobile station a second channel in said mobile communications system, for enabling uncontended access by uplink packet traffic;

allocating to said first mobile station an exclusive priority for use of at least a third channel in said mobile communications system, for carrying said uplink packet traffic, said first mobile station having said exclusive priority for use of said first and third channels and reserved access to said second channel during a same service interval; and at least temporarily releasing at least one of said first and third channels for other traffic during a period when packet traffic of said first mobile station is not being carried.

3. The method of claim 1 or 2, wherein said mobile communications system comprises a TDMA communications system.

4. The method of claim 1 or 2, wherein said mobile communications system comprises a digital cellular radio system.

5. The method of claim 1 or 2, wherein said mobile communications system comprises a GSM system.

6. The method of claim 1 or 2, wherein said multiple access packet reservation protocol comprises a slotted-ALOHA multiple access protocol.

7. The method of claim 1 or 2, wherein said first channel comprises a first physical channel.

8. The method of claim 1 or 2, wherein said third channel comprises a third physical channel.

9. The method of claim 1 or 2, wherein said first and third channel comprise a physical channel.

10. The method of claim 1 or 2, wherein said second channel comprises a random access channel.

11. The method of claim 1 or 2, wherein said second channel comprises a Packet Random Access Channel (PRACH).

12. The method of claim 1 or 2, wherein said first channel and said third channel comprise a Packet Data Traffic Channel (PDTCH).

13. The method of claim 1 or 2, wherein said step of reserving a second channel comprises dimensioning a random access channel such that a rate of random access collisions between uplink traffic is reduced.

14. The method of claim 1 or 2, further comprising the steps of:
handing over a mobile station from a first cell to a second cell; and
repeating said allocating and reserving steps for said second cell.

15. The method of claim 1 or 2, further comprising the steps of:
handing over a mobile station from a first cell to a second cell; and
reassigning channels corresponding to said first channel, said second channel, and said third channel for exclusive priority use by said mobile station.

16. A method for conveying packet traffic between a mobile communications network and a wired communications network, comprising the steps of:
allocating to a first mobile station an exclusive priority for use of at least a first channel in said mobile communications network, for carrying downlink packet traffic, said first channel having a first negotiated bandwidth and a first processing delay;
reserving a second channel in said mobile communications network, for enabling uncontended access to said mobile communications network by uplink packet traffic, said second channel having a second processing delay;
allocating to said first mobile station an exclusive priority for use of at least a third channel in said mobile communications network, for carrying said uplink packet traffic, said third channel having a third negotiated bandwidth and a third processing delay;
translating each of said first and third negotiated bandwidths into a respective associated first and third wired communications network bandwidth;
translating each of said first, second and third processing delays into a respective associated first, second and third wired communications network processing delay; and
said mobile communications network requesting of said wired communications network allocation of at least one of said first and third wired network bandwidths, and at least one of said first, second and third wired processing delays, for conveying said packet traffic therebetween.

17. The method of claim 16, wherein said mobile communications network comprises a GSM network.

18. The method of claim 16, wherein said wired communications network comprises an Internet network.

19. A method for use in a cellular packet data communications system that uses a plurality of shared packet data channels, for improving an obtainable quality of service, comprising the steps of:
assigning simultaneously for prioritized use to a first mobile terminal, through negotiation, a plurality of uplink and downlink packet data channels of said plurality of shared packet data channels; and
releasing said assigned plurality of uplink and downlink packet data channels in response to a signal from at least one of said first mobile terminal and a network in said cellular packet data communications system, said first mobile terminal thereby being guaranteed use of said assigned plurality of uplink and downlink packet data channels.

20. The method of claim 19, wherein at least a second mobile terminal accesses said assigned plurality of uplink and downlink packet data channels during an idle traffic period for said first mobile terminal.

21. The method of claim 19, wherein said first mobile station uses said plurality of uplink and downlink packet data channels and all other packet data traffic thereon is interrupted.

22. The method of claim 19, wherein scheduling of said uplink packet data traffic is controlled by an uplink state flag.

23. The method of claim 19, further comprising the step of allocating a separate reserved access sub-channel to said first mobile terminal to avoid collisions with traffic from a mobile terminal other than said first mobile terminal, and thus reducing uplink channel access delays.

24. The method of claim 23, wherein said separate reserved access sub-channel comprises a reserved random access sub-channel.

25. A mobile communications system that uses at least a multiple access packet reservation protocol, comprising:
a first mobile terminal means for transmitting and receiving packet traffic, said first mobile terminal means being allocated an exclusive use of at least a first uplink channel and a second downlink channel in said mobile communications system;
an access channel on an uplink of said mobile communications system;
a reservation means for reserving uncontended access to said access channel for said first mobile terminal means; and
wherein said first mobile terminal means has exclusive use of said first uplink channel and said second downlink channel and reserved uncontended access to said access channel during a same service interval.

26. The mobile communications system of claim 25, further comprising a TDMA communications system.

27. The mobile communications system of claim 25, further comprising a digital cellular radio system.

28. The mobile communications system of claim 25, wherein said access channel comprises a random access sub-channel.

29. The mobile communications system of claim 25, wherein said first mobile terminal means comprises a prioritized (VIP) mobile station.

30. The method of claim 1, wherein said same service interval comprises a service activation period.

31. The method of claim 2, wherein said exclusive priority corresponds to a priority level, among a plurality of priority levels, associated with a class of mobile stations.

32. The method of claim 2, wherein the at least one of said first and third channels that are at least temporarily released for other traffic continue to be allocated to said first mobile station during the released period.

33. The method of claim 16, wherein said exclusive priority is a priority level corresponding to a class of mobile stations.

34. The method of claim 16, wherein said second channel is reserved for said first mobile station.

35. A method for improving performance of a mobile communications system that uses at least a multiple access packet reservation protocol, comprising the steps of:

allocating to a first mobile station an exclusive use of at least a first channel in said mobile communications system, for carrying downlink packet traffic;

allocating to said first mobile station an exclusive use of at least a second channel in said mobile communications system, for carrying uplink packet traffic;

reserving for said first mobile station a third channel in said mobile communications system, for enabling uncontended access by said uplink packet traffic over said second channel; and wherein said first mobile station has exclusive use of said first and second channels and reserved access to said third channel during a same service interval.

* * * * *

UNITED STATES PATENT AND TRADEMARK OFFICE
CERTIFICATE OF CORRECTION

PATENT NO. : 6,031,832
DATED : February 29, 2000
INVENTOR(S) : Dalibor Turina

It is certified that error appears in the above-identified patent and that said Letters Patent is hereby corrected as shown below:

Column 2, line 49        Replace "th"
                                       With --the--

Signed and Sealed this

Twenty-sixth Day of December, 2000

Attest:

Q. TODD DICKINSON

Attesting Officer                Director of Patents and Trademarks